(12) United States Patent
Topolkaraev et al.

(10) Patent No.: US 6,586,354 B1
(45) Date of Patent: *Jul. 1, 2003

(54) MICROLAYER BREATHABLE HYBRID FILMS OF DEGRADABLE POLYMERS AND THERMOPLASTIC ELASTOMERS

(75) Inventors: Vasily A. Topolkaraev, Appleton, WI (US); Dave A. Soerens, Neenah, WI (US); Oomman P. Thomas, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,084

(22) Filed: Dec. 28, 1998

(51) Int. Cl.[7] ................................................ B32B 27/12
(52) U.S. Cl. ....................... 442/394; 442/398; 442/399; 428/333; 428/913
(58) Field of Search ................................ 428/216, 333, 428/913; 442/398, 399

(56) References Cited

U.S. PATENT DOCUMENTS

| 3,051,453 A | 8/1962 | Sluijters |
| 3,576,707 A | 4/1971 | Schrenk et al. |
| 6,117,438 A | * 9/2000 | Topolkaraev et al. ....... 424/404 |
| 6,261,674 B1 | * 7/2001 | Branham et al. ........... 428/218 |

OTHER PUBLICATIONS

Mueller et al., "Novel Structures by Microlayer Coextrusion—Talc–Filled PP, PC/SAN, and HDPE/LLDPE," Polymer Engineering and Science, vol. 37, No. 2, pp. 355–362 (Feb. 1997).

Schrenk et al., "Coextruded Multilayer Polymer Films and Sheets," Polymer Blends, vol. 2, Chapter 15, Academic Press, Inc., pp. 129–165 (1978).

Im et al., "Coextruded Microlayer Film and Sheet," Journal of Plastic Film & Sheeting, vol. 4, pp. 104–115 (Apr. 1988).

* cited by examiner

Primary Examiner—Elizabeth M. Cole
(74) Attorney, Agent, or Firm—Kilpatrick Stockton LLP

(57) ABSTRACT

A multi-microlayer thermoplastic film structure and methods of making the same. More specifically, this invention relates to a multi-microlayer film having a degradable polymer layer and a thermoplastic elastomer layer. Filler materials may be included in either the degradable polymer layer or the thermoplastic elastomer layer. The multi-microlayer films may be formed in a co-extrusion process.

31 Claims, 2 Drawing Sheets

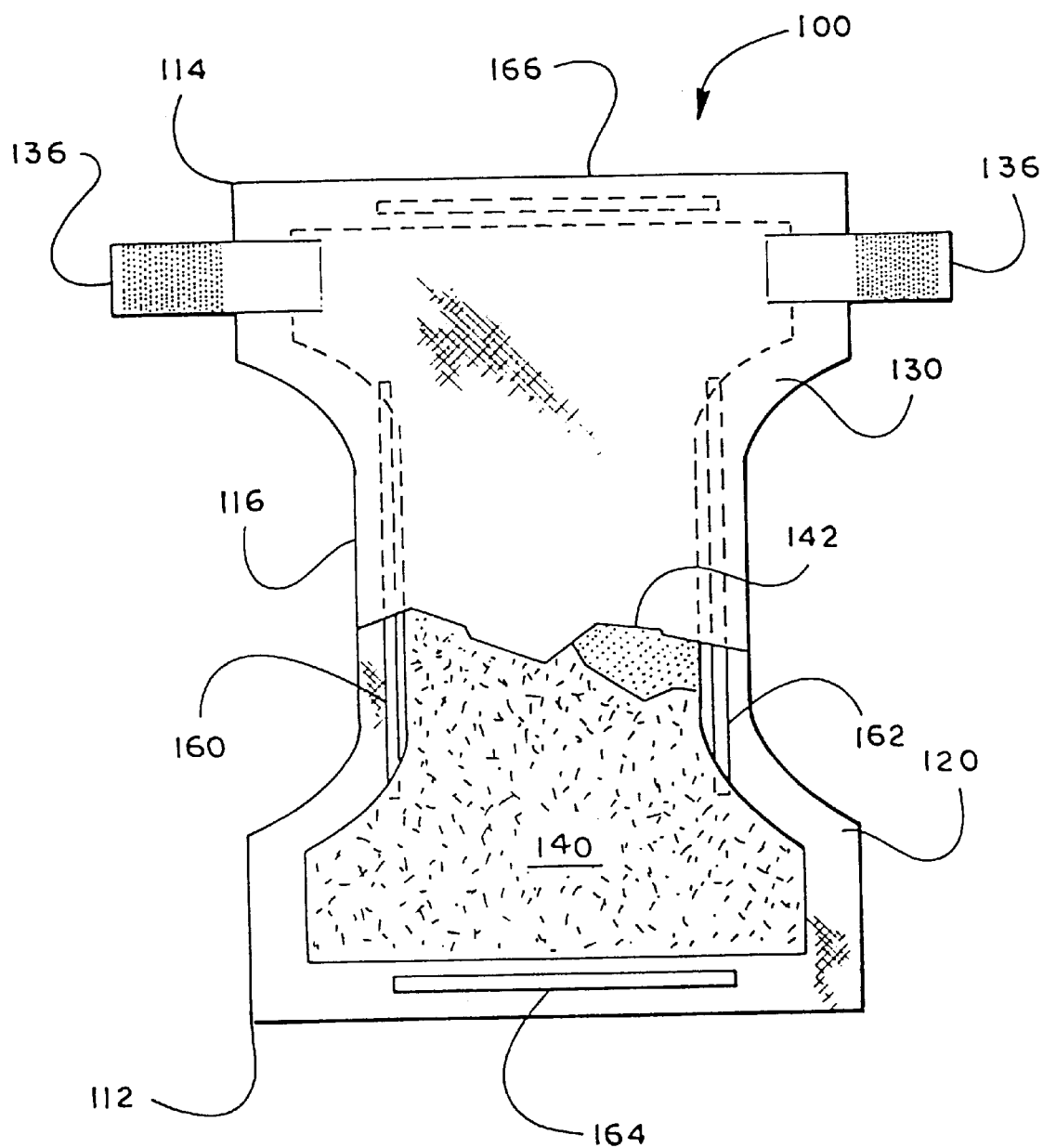
Fig_3

MICROLAYER BREATHABLE HYBRID FILMS OF DEGRADABLE POLYMERS AND THERMOPLASTIC ELASTOMERS

FIELD OF THE INVENTION

The present invention relates, in general, to microlayer, multi-microlayer hybrid thermoplastic film structures and methods of making the same. More specifically, this invention relates to a multi-microlayer film having a degradable polymer layer and a thermoplastic elastomer layer.

BACKGROUND OF THE INVENTION

Degradable polymers are widely used in a variety of different applications. These polymers are used in many different water-dispersible thermoformable articles, such as fibers, films and fabrics which maintain their integrity and strength when in use, but dissolve and disperse when placed in contact with large amounts of water. These fibers, films and fabrics are used in products such as personal care products, diapers, feminine napkins, wipes, incontinence products, release liners, product packaging, etc., which contain the above-mentioned fibers, films and fabrics.

Articles made from multi-layer films having a layer of a water or biologically degradable polymer are known. The other layers are typically polymers which lend structural support to the degradable polymer layer during use and provide a liquid barrier to help prevent premature degradation of the article.

However, multi-layer articles having a layer of a degradable polymer are relatively inflexible and do not offer a significant degree of breathability, making some articles uncomfortable to use for an extended period of time.

The prior art has attempted to provide articles which offer some degree of flexibility. This flexibility is in the form of elasticity of the article, which has been created by mixing an elastomeric resin with a polyolefin resin and using these blend compositions in films and articles. However, these films and articles do not offer significant breathability and are not generally water-dispersible.

Additionally, the prior art has provided a multi-layer film having a degradable elastomer layer and a degradable polymer layer. In particular, U.S. Pat. No. 5,391,421 discloses multi-layer films comprising biodegradable polymers. These films have only about 3-5 layers and are made by conventional techniques. Additionally, these films are not necessarily breathable, therefore causing articles made with these films to be uncomfortable to the wearer. Additionally, due to their high wet-state tensile strength, these films are difficult to flush down a conventional toilet since they do not readily disperse.

What is needed in the art is a flushable article having a multi-layer hybrid film which can offer significant breathability and offers elastomeric properties such that the film can be stretched when placed under a stretching force, but which returns to nearly its original shape when the stretching force is removed.

SUMMARY OF THE INVENTION

It is desired to provide a flushable multi-microlayer hybrid film that has elastomeric properties. Additionally, it is desired to provide a hybrid multi-microlayer film having a plurality of degradable polymer microlayers and a plurality of microlayers of a thermoplastic elastomer. Finally, it is desired to provide a nanoscale microlayer assembly of the multi-microlayer hybrid films which offer significant breathability while providing barrier protection against fluids and improved softness and comfort.

The present invention is directed to a multi-microlayer polymer film comprising a plurality of coextruded microlayers including a layer comprising an elastomeric, melt-extrudable polymer and a degradable layer comprising a water or biologically degradable, melt-extrudable polymer. The multi-microlayer film of this invention degrades in water for convenient disposability, but has sufficient strength and breathability for elastomeric use in applications such as disposable absorbent personal care products, garments, and other covering materials. Accordingly, the multi-microlayer polymer film of this invention, and products made with such film, can be easily disposed by flushing down a conventional toilet or drainage system.

One advantage of the multi-microlayer films of the present invention is that they offer a significant improvement in breathability over the prior art multi-layer films. The use of a plurality of microlayers enables films to be produced which permit water vapor produced by an individual to pass through the film and into the atmosphere. This enables the skin to stay drier and makes the film more comfortable to wear while helping to improve skin wellness.

Additionally, these hybrid films are designed to provide a high barrier against liquid penetration through the film. When these films are soaked in an excess amount of water, the films are designed to lose significant strength and toughness. The microlayer polymer film of this invention is particularly suitable for making personal care items such as diapers, feminine care products, adult incontinence products, and training pants, and health care products such as wound dressings or surgical gowns where a unique combination of the film-functional attributes such as softness, elastomeric behavior, water-response, and breathability are desired.

More particularly, the multi-microlayer polymer film of this invention includes a plurality of layers comprising the elastomeric, melt-extrudable polymer and a plurality of degradable layers comprising the water or biologically degradable, melt-extrudable polymer. The plurality of elastomeric layers and plurality of degradable layers are arranged in a series of parallel repeating laminate units, each laminate unit comprising at least one of the elastomeric layers and at least one of the degradable layers.

Generally, the individual microlayers of the film of this invention have a thickness small enough so that the elastomeric layers and the degradable layers of the microlayer film adhere to one another to form a laminate. Each microlayer in the polymer film of this invention has a thickness from about 10 angstroms to about 150 microns. Desirably, each microlayer has a thickness which does not exceed 50 microns and preferably does not exceed 10 microns. More particularly, each microlayer has a thickness which is not less than 100 angstroms and preferably not less than 500 angstroms. Broadly described, the film of this invention has degradable and elastomeric layers totaling about 8 to about 17,000 in number, and preferably about 60 to about 8000 in number. Thinner microlayer films, such as for personal care product covers, have a total of about 60 to about 4000 degradable and elastomeric microlayers. Preferably, such film has about 120 to about 1000 degradable and elastomeric microlayers.

According to a particular embodiment of the present invention, each laminate unit of the multi-microlayer film can include a tie layer positioned between the elastomeric layer and the degradable layer for modifying or enhancing properties of the microlayer film. The tie layer can be formed from a variety of polymers. Suitable polymers are chosen depending on the desired properties of the microlayer film. For example, the tie layer polymer can be selected to have an affinity to the elastomeric layer or the degradable layer or both for improving adhesion and interaction between those layers. The tie layer polymer can also be selected to enhance other properties of the microlayer film such as toughness and barrier.

According to another aspect of this invention, a method for making a multi-microlayer polymer film is provided. This method includes coextruding an elastomeric, melt-extrudable polymer and a degradable, melt-extrudable polymer to form a laminate comprising an elastomeric layer including the elastomeric, melt-extrudable polymer and a degradable layer including a degradable, melt-extrudable polymer. The method further includes separating the laminate while the laminate is in a melt-extrudable state to form a pair of laminate halves each including a portion of the elastomeric layer and a portion of the degradable layer. After separation, the laminate halves are thinned and widened and then stacked on top of one another to reform the laminate so that the laminate comprises a plurality of repeating laminate units in parallel stacking arrangement. Each laminate unit comprises an elastomeric layer including the elastomeric, melt-extrudable polymer and a degradable layer including the degradable, melt-extrudable polymer. The steps of separating, thinning and widening, and stacking are repeated to form the laminate into the multi-microlayer polymer film. The resulting microlayer film can also be stretched uniaxially or biaxially and thinned to reduce the basis weight of the microlayer film, enhance access of water and other aqueous liquids into the laminate structure of the microlayer film, enhance disintegration of the microlayer film in water, and enhance the water vapor transport rate or breathability of the film.

BRIEF DESCRIPTION OF DRAWINGS

FIG. 3 is a partial plan view of a diaper made according to an embodiment of the present invention.

DETAILED DESCRIPTION

Figure 1:
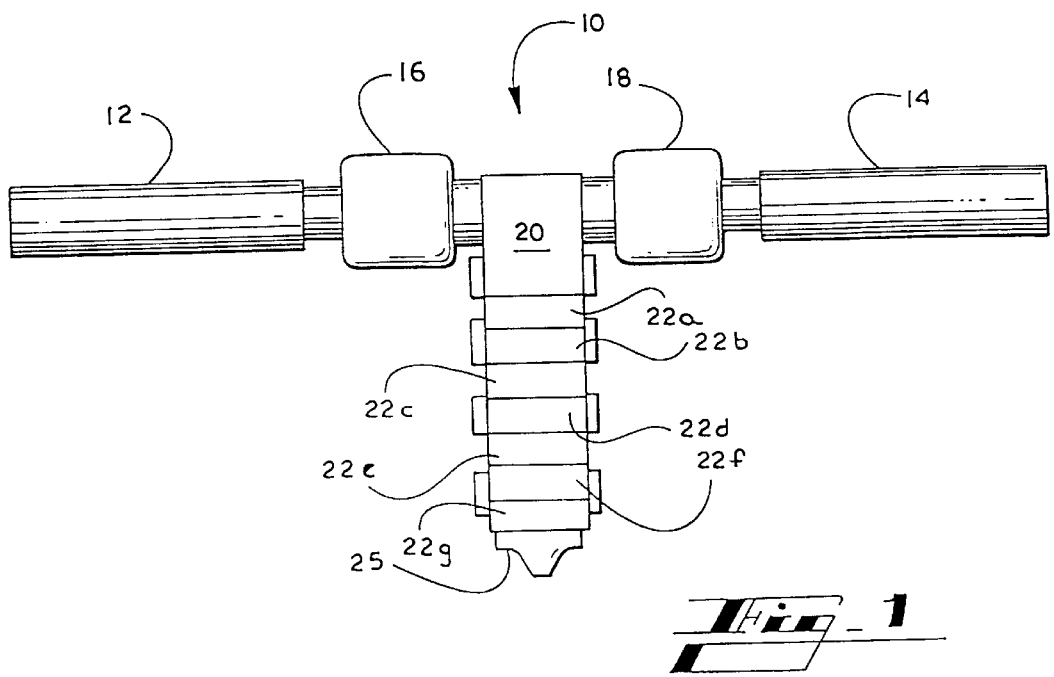
FIG. 1 is a plan view of a coextrusion system for making a microlayer polymer film in accordance with an embodiment of this invention.

The present invention encompasses a multi-microlayer polymer film which degrades in water and/or in the presence of microorganisms for disposability, but has sufficient elasticity, strength and breathability for use in applications such as absorbent personal care products. Below is a detailed description of embodiments of this invention including a method for coextruding the microlayer polymer film, followed by a description of uses and properties of the film and particular examples of the film.

This invention comprises novel hybrid multi-microlayer films composed of a multi-microlayer assembly of water or biologically degradable polymer and thermoplastic elastomers (TPE). By definition, "multi-microlayer" means a film having a plurality of alternating layers wherein, based upon the process by which the film is made, each microlayer becomes partially integrated or adhered with the layers above and below the microlayer. This is in contrast to "multi-layer" films wherein a conventional co-extruded film-making equipment forms a film having only a few layers and wherein each layer is separate and distinct from each other layer. Since each microlayer in the present invention can be partially integrated into the layers above and below, the elastomeric qualities are imparted throughout the film. The partial integration of the layers also increases the breathability and dispersability of the film.

The novel hybrid multi-microlayer films are designed to impart elastomeric characteristics to a degradable polymer resin and produce water responsive/degradable films with enhanced softness and flexibility, reduced modulus, improved toughness, controlled breathability and enhanced recovery for use as a film component in personal and health care products. These hybrid films are useful in the creation of flushable and/or degradable articles that are soft, breathable, and elastomeric. By definition, "elastomeric" or "enhanced recovery" means the ability of the film or article to be stretched by a stretching force from its original length and to retract rapidly upon release of the stretching force to approximately the original length. By "flushable" it is meant that the film either becomes water-dispersible, water-disintegratable or water-weakenable such that the film may be flushed down a conventional toilet into a septic tank or public sewer system. By "water-dispersible" it is meant that the film dissolves or breaks into pieces smaller than a 20 mesh after being immersed in water for approximately five minutes. By "water-disintegratable" it is meant that the film breaks into multiple pieces within five minutes of immersion in water and that some of the pieces will be caught by a 20 mesh screen without slipping through. By "water-weakenable" it is meant that the composition remains in one piece but weakens and loses rigidity after five minutes of immersion in water and becomes drapeable, i.e. it bends without an external force applied thereto when it is held by one side at a horizontal position. The term "water-stable" means that the composition does not become drapeable after five minutes of immersion in water and remains in one piece after being immersed in water for five minutes. Disposal by flushing provides the additional benefit of providing a simple, convenient and sanitary means of disposal. However, while capable of being flushed, these personal care products must also have sufficient strength during use to provide the desired function for which they were designed. Personal care products should be able to withstand the elevated temperature and humidity conditions encountered during use and storage.

The multi-microlayer polymer film of this invention comprises a plurality of coextruded microlayers which form a laminate structure. The coextruded microlayers include a plurality of elastomeric layers comprising an elastomeric, melt-extrudable polymer and a plurality of degradable layers comprising a degradable melt-extrudable polymer. The plurality of elastomeric layers and plurality of degradable layers are arranged in a series of parallel repeating laminate units. Each laminate unit comprises at least one of the degradable layers and at least one of the elastomeric layers. Desirably, each laminate unit has one degradable layer laminated to an elastomeric layer so that the coextruded microlayers alternate between degradable and elastomeric layers. Alternatively, each laminate unit can also include a tie or transition layer between the degradable layer and the elastomeric layer. The tie layer is useful for modifying or enhancing properties of the microlayer film.

Generally, the individual microlayers of the film of this invention have a thickness small enough so that the elastomeric layers and the degradable layers of the multi-microlayer film adhere to one another to form a laminate and do not delaminate despite possible incompatibility of the elastomeric and degradable polymers. Each microlayer in the polymer film of this invention has a thickness from about 10 angstroms to about 150 microns. Desirably, each microlayer has a thickness which does not exceed 50 microns and preferably does not exceed 1.0 micron. More particularly, each microlayer has a thickness which is at least 100 angstroms and preferably at least 500 angstroms. Preferably, the microlayers of the film have a thickness from about 500 angstroms to about 10 microns. Microlayers, however, form laminate films with high integrity and strength because they do not delaminate after microlayer coextrusion due to the partial integration or strong adhesion. Microlayers enable combination of 2 or more layers of normally incompatible polymers into a monolithic film with a strong coupling between individual layers without using compatibilizing agents. However, compatabilizing agents may still be used to enhance the properties of the multi-microlayer films of the present invention. The term "monolithic film" as used herein means a film which has multiple layers which adhere to one another and function as a single unit.

The number of microlayers in the film of this invention vary broadly from about 8 to 17,000 in number, and preferably from about 60 to 8000 in number. A suitable cover material for personal care items desirably has from about 60 to about 4000 microlayers and preferably from about 120 to about 1000 microlayers. However, based upon the thickness of each microlayer, the number of microlayers in the film is determined by the desired overall film thickness. Preferably, the multi-microlayer hybrid films have a thickness of less than about 10 mils. More preferably, the films have a thickness of less than about 7 mils. Most preferably, the films have a thickness of less than about 5 mils.

The term "melt-extrudable polymer" as used herein means a thermoplastic material having a melt flow rate (MFR) value of not less than about 0.2 grams/10 minutes, based on ASTM D1238. More particularly, the MFR value of suitable melt-extrudable polymers ranges from about 0.2 g/10 minutes to about 100 g/10 minutes. Desirably, the MFR value of suitable melt-extrudable polymers ranges from about 0.4 g/10 minutes to about 50 g/10 minutes, and preferably, ranges from about 0.8 g/10 minutes to about 20 g/10 minutes to provide desired levels of processability.

Still more particularly, suitable melt-extrudable thermoplastic polymers for use in this invention are stretchable in solid state to allow a stretch processing of the multi-microlayered film. Stretching of the film reduces film thickness and can create porosity, thereby increasing the water vapor transport rate of the film and, hence, breathability. Also, by creating porosity, the multi-microlayer films will more readily disperse when placed in water. The ratio of true tensile fracture stress (tensile force at failure divided by the cross-sectional area of the failed specimen), and the stress at yielding, is useful to determine the stretchability of the polymer film. Desirably, such ratio for suitable melt-extrudable polymers used in this invention ranges from about 1 to about 150, more desirably from about 5 to about 100, and preferably from about 10 to about 50.

The thermoplastic elastomer microlayers of the film of this invention desirably comprise an elastomeric, melt-extrudable polymer. The thermoplastic elastomer must be melt-extrudable so that the thermoplastic elastomer can be coextruded along with the degradable polymer to form the microlayer film. A variety of thermoplastic elastomers, such as metallocene polyolefins, thermoplastic polyurethanes, styrenic block copolymers, etc., can be used in this invention. Suitable thermoplastic elastomers include, but are not limited to, metallocene low density polyethylene, elastomeric polyurethanes, ethylene-octene copolymers, polyester polyurethane, natural rubber, nitrile rubber, butyl rubber, ethylene-propylene terpolymers, silicone rubber, polyurethane rubber, thermoplastic rubbers, elastomeric block copolymers, copolymers of polyethylene oxide and polybutylene terephthalate, polyamide-polyether block copolymers, styrenic block copolymers, elastomeric polypropylene, or mixtures thereof.

The elastomeric layer of the microlayer film of this invention may also include processing additives and solid state modifiers in amounts from about 0.05 to about 10 parts of additive to 100 parts of resin. Such additives may include calcium stearate or other acid scavengers, organo silicone compounds, silicone glycol copolymers, olefinic elastomers, and low molecular weight paraffins or lubricating additives and surfactants. The various additives can have a plasticizing effect, improve the strength and softness of the film, improve interaction with fluids and help facilitate the extrusion, film casting, stretch processing, and interaction with fluids. Antioxidants can also be added to improve oxidative stability.

The degradable microlayers of the film of this invention desirably comprise a water degradable, melt-extrudable polymer and/or a biologically degradable, melt-extrudable polymer, or combinations, blends or mixtures thereof. The degradable polymer should be melt-extrudable so that the polymer can be coextruded along with the elastomeric polymer to form the microlayer film. In addition, the degradable polymer is preferably permeable to water vapor when in the form of a film. Suitable water degradable polymers are characterized by being soluble or dispersible in water or swellable in water, or by having tensile properties, such as tensile strength and tensile modulus, which drop substantially when the polymer, in the form of a film, is wetted with water. When dry, however, the water degradable polymer holds shape and has integrity as a film. Preferred water-degradable polymers include water soluble and water dispersible polymers which disintegrate in water. Desirably, the water degradable polymers disintegrate in water in less than about 1 minute. Suitable water degradable polymers include polyethylene oxide (PEO), copolymers of polyethylene oxide and polypropylene oxide, other water dispersible ethylene oxide copolymers, water dispersible blends of polyethylene oxide, water degradable grades of polyvinyl alcohol, blends of polyvinyl alcohol, poly(vinyl pyrrolidone), polyethyloxazoline, water degradable branched polyesters and copolyesters, water dispersible polyurethanes, water degradable acrylic acid based copolymers, water dispersible polyvinyl methyl ether, cellulose derivatives such as methyl cellulose, hydroxypropyl cellulose, methylated hydroxypropyl cellulose, hydroxypropyl methyl cellulose and ethyl cellulose, and the like.

Suitable biologically degradable polymers are characterized by being degraded in the presence of naturally occurring microorganisms such that the films break down into smaller pieces or loses strength significantly, such that if the film is placed in a biologically-active environment, for example composting and sludge digestion, the film will be broken down. Biologically degradable polymers useful in the present invention include, but are not limited to, polycaprolactone, polybutylene succinate, poly(butylene succinate-adipate), poly(lactic acid), polyhydroxybutyrate-co-valerate, polyethylene adipate, polypropylene succinate, polylactic acid-poly(ethylene oxide) copolymers, and blends and mixtures thereof. Specific examples of biodegradable resins useful in the present invention include, but are not limited to polycaprolactone TONE® P-787 resin from Union Carbide, and BIONOLLE® 1003, 3001 and 3003 resins from Showa Highpolymer, Japan.

The preferred water-degradable polymer for making a water degradable multi-microlayer polymer film is PEO. Grafted or chemically modified PEO is also suitable. Suitable grafted or chemically modified PEO resins and their method of making are described in U.S. Ser. Nos. 09/001, 408, 09/001,831 and 09/002,197, the disclosures of which are hereby incorporated in their entirety. PEO resins having molecular weights ranging from about 100,000 to 8,000,000 are useful. High molecular weight PEO resins are desirable for enhanced liquid stability, mechanical strength and ductility, while low molecular weight PEO resins provide better melt flow and film forming properties. Examples of particularly suitable PEO resins utilized in this invention include the following: (1) WSR N-80, molecular weight of about 200,000, (2) WSR N-750, molecular weight of about 300,000, (3) WSR N-3000, molecular weight of about 400,000, and (4) WSRN 12K, molecular weight of about 1,000,000, all supplied by Union Carbide in a powder form and pelletized at Planet Polymer Technologies of San Diego, Calif. Other suitable commercially available water degradable polymers include ECOMATY AX-2000 polyvinyl alcohol available from Nippon Gohsei having offices in New York, N.Y. and Eastman AQ branched polyesters and copolyesters.

The degradable microlayers may also include processing additives and solid-state performance modifiers blended with the degradable polymer in amounts from about 0.05 up to 30 parts of additive to 100 parts of polymer resin. Suitable additives include a wide variety of materials such as water, polymer emulsions, surfactants, mineral acids, halogens, urea, polyureas, gelatin, adipic acid, metal halides, metal salts, phenols, phenolic resins, polymeric acids, benzoic acid derivatives, glycol derivatives, phosphoric acid derivatives and sorbitan derivatives. The various additives can have a plasticizing affect, improve melt flow characteristics, improve strength and toughness, improve modulus, modify crystalline structure, control release properties, and modify electrochemical behavior. Examples of suitable additives include polyoxyethylene sorbitan monolaurate, Tween 20, ethoxylated nonyl phenol, Tergitol NP-13, adipic acid and diethylene glycol dibenzoate. Antioxidants and ultraviolet stabilizers can also be added to improve oxidative stability and stability to UV light.

Both the degradable and elastomeric microlayers can include a supplemental material such as a filler material, a surfactant, or other surface active material. The filler material can be a particulate filler material to enhance water vapor permeability of the film, thereby further increasing the breathability of the film. Particulate filler material creates discontinuity in the microlayers to provide pathways for water vapor to move through the film. Particulate filler material can also enhance the ability of the microlayer film to absorb or immobilize fluid, enhance degradation of the microlayer film in water, provide porosity-initiating debonding sites to enhance the formation of pores when the microlayer film is stretched, improve processability of the microlayer film and reduce production cost of the microlayer film. In addition, lubricating and release agents can facilitate the formation of microvoids and the development of a porous structure in the film during stretching of the film and can reduce adhesion and friction at filler-resin interface. Surface active materials such as surfactants coated on the filler material can reduce the surface energy of the film, increase hydrophilicity of the film, reduce film stickiness, provide lubrication, or reduce the coefficient of friction of the film.

Suitable filler materials can be organic or inorganic, and are desirably in a form of individual, discreet particles. Suitable inorganic filler materials include metal oxides, metal hydroxides, metal carbonates, metal sulfates, various kinds of clay, silica, alumina, powdered metals, glass microspheres, or vugular void-containing particles. Particularly suitable filler materials include calcium carbonate, barium sulfate, sodium carbonate, magnesium carbonate, magnesium sulfate, barium carbonate, kaolin, carbon, calcium oxide, magnesium oxide, aluminum hydroxide, and titanium dioxide. Still other inorganic fillers can include those with particles having higher aspect ratios such as talc, mica and wollastonite. Suitable organic filler materials include, for example, latex particles, particles of thermoplastic elastomers, pulp powders, wood powders, cellulose derivatives, chitin, chitozan powder, powders of highly crystalline, high melting polymers, beads of highly crosslinked polymers, organosilicone powders, and powders of super absorbent polymers, such as polyacrylic acid, and the like, as well as combinations and derivatives thereof. These filler materials can improve toughness, softness, opacity, vapor transport rate (breathability), water dispersability, biodegradability, fluid immobilization and absorption, skin wellness, and other beneficial attributes of the microlayer film.

The particulate filler material is suitably present in the microlayer film in an amount from about 0.5 to about 70% by weight of the film. Desirably, the average particle size of the filler material does not exceed about 10 microns, more desirably does not exceed 8 microns, even more desirably does not exceed about 5 microns, and preferably does not exceed about 1 micron.

Suitable commercially available filler materials include the following:

1. SUPERMITE®, an ultrafine ground $CaCaCO_3$, which is available from ECC International of Atlanta, Ga. This material has a top cut particle size of about 8 microns and a mean particle size of about 1 micron and can be coated with a surfactant, such as Dow Corning 193 surfactant, before mixing with the polymer.

2. SUPERCOAT®, a coated ultrafine ground $CaCaCO_3$, which is available from ECC International of Atlanta, Ga. This material has a top cut particle size of about 8 microns and a mean particle size of about 1 micron.

3. OMYACARB® UF, high purity, ultrafine, wet ground $CaCaCO_3$, which is available from OMYA, Inc., of Proctor, Vt. This material has a top cut particle size of about 4 microns and an average particle size of about 0.7 microns and provides good processability. This filler can also be coated with a surfactant such as Dow Corning 193 surfactant before mixing with the polymer.

4. OMYACARB® UFT $CaCaCO_3$, an ultrafine pigment surface coated with stearic acid, available from OMYA, Inc. This material has a top cut particle size of about 4 microns and a mean particle size of about 0.7 microns and provides good processability.

Surfactants can increase the hydrophilicity of the film and enhance the water vapor permeability of the film and can improve filler dispersion in the polymer. For example, the surface active material may be blended or otherwise incorporated onto the particulate filler material before the filler material is mixed with the elastomeric polymer. Suitable surface active materials can have a hydrophile-lipophile balance (HLB) number from about 6 to about 18. Desirably, the HLB number of the surface active material ranges from about 8 to about 16, and more desirably ranges from about 12 to about 15. When the HLB number is too low, the wettability can be insufficient and when the HLB number is too high, the surface active material may have insufficient adhesion to the polymer matrix of elastomeric layer, and may be too easily washed away during use. A number of commercially available surfactants can be found in *McMcutcheon's* Vol. 2; *Functional Materials*, 1995.

Suitable surfactants and surface-active materials for treating the particulate filler material include silicone glycol copolymers, ethylene glycol oligomers, acrylic acid, hydrogen-bonded complexes, carboxylated alcohol, ethoxylates, various ethoxylated alcohols, ethoxylated alkyl phenols, ethoxylated fatty esters, stearic acid, behenic acid, and the like, as well as combinations thereof. Suitable commercially available surfactants include the following:

1. Surfactants composed of ethoxylated alkyl phenols, such as IGEPAL RC-620, RC-630, CA-620, 630, 720, CO-530, 610, 630, 660, 710, and 730, which are available from Rhone-Poulenc, Inc. of Cranbury, N.J.

2. Surfactants composed of silicone glycol copolymers, such as Dow Coming D190, D193, FF400, and D1315, available from Dow Coming of Midland, Mich.

3. Surfactants composed of ethoxylated mono and diglycerides, such as Mazel 80 MGK, masil SF 19, and Mazel 165 C, available from PPG Industries of Gurneen, Ill.

4. Surfactants composed of ethoxylated alcohols, such as Genapol 26-L-98N, Genapol 26-L60N, and Genapol 26-L-5 which are available from Hoechst Celanese Corporation of Charlotte, N.C.

5. Surfactants composed of carboxylated alcohol ethoxylates, such as Marlowet 4700 and Marlowet 4703, which are available from Huls America, Inc. of Piscataway, N.J.

6. Ethoxylated fatty esters, such as Pationic 138C, Pationic 122A, Pationic SSL, which are available from R.I.T.A. Corporation of Woodstock, Ill.

The surface activate material is suitably present in the respective microlayer in an amount from about 0.5 to about 20% by weight of the microlayer. Desirably, the surface active material is present in the respective microlayer in an amount from about 1 to about 15% by weight of the microlayer, and more desirably in an amount from about 2 to about 10% by weight of the microlayer. The surface activate material is suitably present on the particulate in an amount of from about 1 to about 12% by weight of the filler material.

Additionally, as described in commonly assigned U.S. patent application Ser. No. 09/474,043, entitled "Breathable Composite Elastic Material Having a Cellular Elastomeric Film Layer and Method of Making Same", which is hereby incorporated by reference in its entirety, each microlayer may also be formed with a blowing agent. Closed and/or open micro or macro cells may be introduced into the microlayers to provide a path for easy diffusion of water or water vapor, thereby increasing the breathability and water-dispersibility of the film. With additional paths, water vapor may pass more easily through the film which increases breathability and makes any personal care article made with the film more comfortable to wear. The additional paths also allow more water to contact the degradable material, thereby increasing the rate of degradation and the water-dispersibility of the film. While celogen blowing agents are preferred, any suitable blowing agent may be used, as described in the above-identified patent application.

The tie or transition layer described in the alternative embodiment above can be formed from a variety of melt extrudable polymers. Suitable polymers are chosen depending on the desired properties of the microlayer film. For example, the tie layer polymer can be selected to have an affinity to the elastomeric layer or the degradable layer or both for improving adhesion and interaction between those layers. The tie layer polymer can also be selected to enhance other properties of the microlayer film such as toughness and barrier and can enhance the disintegration of the microlayer film in water. Suitable polymers for the tie layer depend on the particular polymers used for the degradable layer and the elastomeric layer, but generally include ethylene acrylic acid copolymers, thermoplastic polyesters, polyalkane-poly (ethylene oxide) block copolymers, poly(vinyl alcohol) block copolymers, ionomer resins, and the like. Desirably, the tie layer constitutes from about 0.5 to about 20% by weight of the microlayer film. More desirably, the tie layer constitutes from about 1.5 to about 15% by weight of the microlayer film and. even more desirably constitutes from about 3 to about 10% by weight of the microlayer of film.

A suitable method for making the microlayer film of this invention is a microlayer coextrusion process wherein two or more polymers are coextruded to form a laminate with two or more layers, which laminate is then manipulated to multiply the number of layers in the film. FIG. 1 illustrates a coextrusion device 10 for forming microlayer films. This device includes a pair of opposed screw extruders 12 and 14 connected through respective metering pumps 16 and 18 to a coextrusion block 20. A plurality of multiplying elements 22*a–g* extend in series from the coextrusion block perpendicularly to the screw extruders 12 and 14. Each of the multiplying elements includes a die element 24 disposed in the melt flow passageway of the coextrusion device. The last multiplying element 22*g* is attached to a discharge nozzle 25 through which the final product extrudes.

Figure 2:
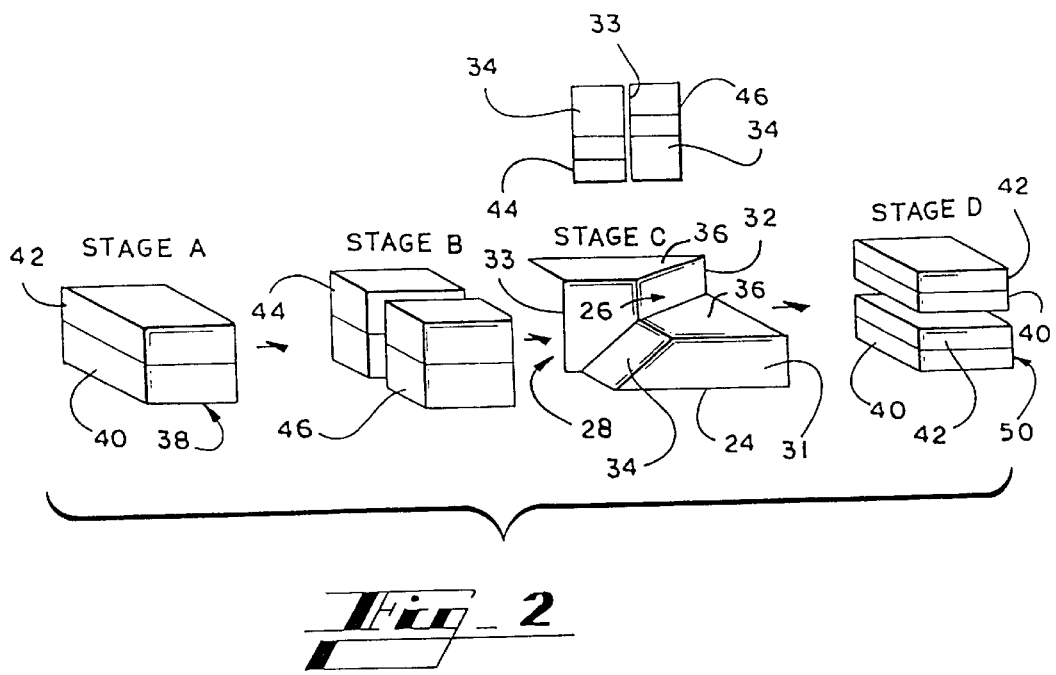
FIG. 2 is a schematic diagram illustrating a multiplying die element and the multiplying process used in the coextrusion system illustrated in FIG. 1.

A schematic diagram of the coextrusion process carried out by the coextrusion device 10 is illustrated in FIG. 2. FIG. 2 also illustrates the structure of the die element 24 disposed in each of the multiplying elements 22*a–g*. Each die element 24 divides the melt flow passage into two passages 26 and 28 with adjacent blocks 31 and 32 separated by a dividing wall 33. Each of the blocks 31 and 32 includes a ramp 34 and an expansion platform 36. The ramps 34 of the respective die element blocks 31 and 32 slope from opposite sides of the melt flow passage toward the center of the melt flow passage. The expansion platforms 36 extend from the ramps 34 on top of one another.

To make a degradable microlayer film using the coextrusion device 10 illustrated in FIG. 1, an elastomeric resin is extruded through the first single screw extruder 12 into the coextrusion block 20. Likewise, a water degradable polymer, such as PEO, is extruded through the second single screw extruder 14 into the same coextrusion block 20. In the coextrusion block 20, a two-layer melt laminate structure 38 such as that illustrated at stage A in FIG. 2 is formed with the degradable polymer forming a layer on top of a layer of elastomeric polymer. The melt laminate is then extruded through the series of multiplying elements 22*a–g* to form a 256 layer microlaminate with the layers alternating between the degradable polymer and the elastomeric polymer. As the two-layer melt laminate is extruded through the first multiplying element 22*a*, the dividing wall 33 of the die element 24 splits the melt laminate 38 into two halves 44 and 46 each having a layer of degradable polymer 40 and a layer of elastomeric polymer 42. This is illustrated at stage B in FIG. 2. As the melt laminate 38 is split, each of the halves 44 and 46 are forced along the respective ramps 34 and out of the die element 24 along the respective expansion platforms 36. This reconfiguration of the melt laminate is illustrated at stage C in FIG. 2. When the melt laminate 38 exits from the die element 24, the expansion platform 36 positions the split halves 44 and 46 on top of one another to form a four-layer melt laminate 50 having, in parallel stacking arrangement, an elastomeric layer, a degradable layer, an elastomeric layer and a degradable layer in laminate form. This process is repeated as the melt laminate proceeds through each of the multiplying elements 22b–g. When the melt laminate is discharged through the discharge nozzle 25, the melt laminate forms a film having 256 layers.

The foregoing microlayer coextrusion device and process is described in more detail in an article Mueller et al., entitled *Novel Structures By Microlayer Extrusion-Talc-Filled PP, PC/SAN, and HDPE-LLDPE*. A similar process is described in U.S. Pat. No. 3,576,707 and U.S. Pat. No. 3,051,453, the disclosures of which are expressly incorporated herein by reference.

The relative thickness of the degradable and elastomeric layers of the film made by the foregoing process can be controlled by varying the feed ratio of the polymers into the extruders, thus controlling the constituent volume fraction. In addition, one or more extruders can be added to the coextrusion device to increase the number of different polymers in the microlayer film. For example, a third extruder can be added to add a tie layer to the film.

The degradable microlayer film may be subjected to a selected plurality of stretching operations, such as uniaxial stretching operation or biaxial stretching operation. Stretching operations can provide microporous microlayer film with a distinctive porous microlayered morphology, can enhance water vapor transport through the film, and can improve water access, enhance degradability of the film, and enhance elastomeric properties of the film. Preferably, the film is stretched from about 100 to about 500 percent of its original length. More preferably, the film is stretched from about 100 to about 300 percent of its original length.

The key parameters during stretching operations include stretching draw ratio, stretching strain rate, and stretching temperature. During stretching operation, the multi-microlayer film sample may optionally be heated to provide a desired effectiveness of the stretching.

In one particular aspect of the invention, the draw or stretching system may be constructed and arranged to generate a draw ratio which is not less than about 1.1 in the machine and/or transverse directions. The draw ratio is the ratio determined by dividing the final stretched length of the microlayer film by the original unstretched length of the microlayer film along the direction of stretching. The draw ratio in the machine direction (MD) should not be less than about 1.1. Preferably, the draw ratio is not less than about 1.5 and more preferably is not less than about 2.0. In another aspect, the stretching draw ratio in the MD is preferably not more than about 10. More preferably, the draw ratio is not more than about 7 and even more preferably is not more than about 5.

When stretching is arranged in the transverse direction, the stretching draw ratio in the transverse direction (TD) is preferably not less than about 1.1. Even more preferably, the draw ratio in the TD is not less than about 1.5 and more preferably is not less than about 2.0. In another aspect, the stretching draw ratio in the TD is preferably not more than about 10. More preferably, the draw ratio is not more than about 7 and even more preferably is not more than about 5.

The biaxial stretching, if desired, may be accomplished simultaneously or sequentially. With the sequential, biaxial stretching, the initial stretching may be performed in either the MD or the TD.

The microlayer film of the invention can be pretreated to prepare the film for the subsequent stretching operations. The pretreatment can be done by annealing the film at elevated temperatures, by spraying the film with a surface-active fluid (such as a liquid or vapor from the surface-active material employed to surface-modify the filler material), by modifying the physical state of the microlayer film with ultraviolet radiation treatment, an ultrasonic treatment, e-beam treatment, or a high-energy radiation treatment. In addition, the pretreatment of the microlayer film may incorporate a selected combination of two or more of the techniques. A suitable stretching technique is disclosed in U.S. Pat. No. 5,800,758, the disclosure of which is hereby incorporated in its entirety.

The microlayer film of this invention can be laminated to one or more nonwoven webs. Accordingly, the microlayer film of this invention is suitable for absorbent personal care items including diapers, adult incontinence products, feminine care absorbent products, training pants, and health care products such as wound dressings. The microlayer film of this invention can also be used to make surgical drapes and surgical gowns and other disposable garments FIG. 3 illustrates a disposable diaper 100 made according to an embodiment of this invention. The diaper 100 includes a front waistband panel section 112, a rear waistband panel section 114, and an intermediate section 116 which interconnects the front and rear waistband sections. The diaper 100 comprises an outer cover layer 120 which is a breathable microlayer polymer film described above, a liquid permeable liner layer 130, and an absorbent body 140 located between the outer cover layer and the liner layer. Fastening means, such as adhesive tapes 136 are employed to secure the diaper 100 on the wearer. The liner 130 and the outer cover 120 are bonded to each other and to the absorbent body with lines and patterns of adhesive, such as a hot melt, pressure-sensitive adhesive. Elastic members 160, 162, 164, and 166 can be configured about the edges of the diaper for a close fit about the wearer.

The liner layer 130 presents a body-facing surface which is compliant to the wearer's skin. A suitable liner may be manufactured from a wide selection of web materials, such as porous foams, reticulated foams, apertured plastic films, natural fibers (for example, wood or cotton fibers), synthetic fibers (for example, polypropylene or polyester fibers), or a combination of natural and synthetic fibers. Various woven and nonwoven fabrics can be used for liner. For example, the liner may be composed of a meltblown or spunbonded web of polyolefin fibers. The liner 130 may be composed of a hydrophobic material, and the hydrophobic material may be treated with a surfactant or otherwise processed to impart desired level of wettability and hydrophilicity. In particular, liner 130 can be a spunbond polypropylene fabric which is surface treated with Triton X-102 surfactant.

The absorbent body 140 can comprise a matrix of substantially hydrophilic fibers having therein a distribution of high-absorbency material, such as particles of superabsorbent polymer. Examples of suitable fibers include organic fibers, such as cellulosic fibers; synthetic fibers made from wettable thermoplastic polymers such as polyester or polyamide; and synthetic fibers composed of nonwettable polymer, such as polypropylene fibers, which have been hydrophilized by appropriate treatment.

The high absorbency material of the absorbent body 140 may comprise absorbent gelling materials, such as superabsorbents. Examples of synthetic absorbing gelling material include the alkali metal and ammonium salts of poly(acrylic acid) and poly(methacrylic acid), poly(acrylamides) and poly(vinyl ethers).

For example, the breathable outercover 120 may be composed of a breathable microlayer film of the current invention which can be optionally laminated with a nonwoven fabric. Examples of suitable fibers for the nonwoven fabric include organic fibers, such as cellulosic fibers; synthetic fibers made from thermoplastic polymers such as polyester or polyamide; and synthetic fibers composed of thermoplastic polymer, such as polypropylene fibers. The nonwoven fabric can be optionally coated, or otherwise treated to impart desired level of liquid impermeability. Optionally, the microlayer film of the current invention can also be modified or otherwise treated to enhance its barrier property to the level desirable for in-use performance. To enhance barrier property of the microlayer film of the invention, a thin additional barrier layer can be coated or coextruded with the microlayer film.

The outercover material 120 can also be embossed or otherwise be provided with a matte finish to exhibit a more aesthetically pleasing appearance.

Although the absorbent article 100 shown in FIG. 3 is a disposable diaper, it should be understood that the microlayer film of this invention can be used to make a variety of absorbent articles such as those identified above.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Examples 1–33 relate to different embodiments of the present invention. These embodiments exemplify different blends of material, different film thicknesses and different numbers of microlayers. For each of the examples, the mechanical properties, the wet tensile properties, the elastomeric properties, and the breathability were determined.

The mechanical properties of the microlayered films of the examples were determined using a Sintech tensile tester (SINTECH 1/D) and Testworks 3.03 software. The tensile tester is a device available from MTS System Co., a business having offices located in Cary, N.C. The software is also available from MTS System Co., Sintech Division. Equipment and software having substantially equivalent capabilities may also be employed.

Mechanical properties were evaluated according to ASTM Test Method D638-95 with the tensile tester using its strip-testing configuration. The testing was conducted with a 50 pound load cell, and air actuated, rubber coated 3 inch grips. The film testing was conducted with a 1 inch gauge length and a 5 inch/min crosshead speed. An individual film sample was loaded perpendicular to and in the center of the grips, and was held in place when air pressure closes the grips together. The thickness of the film was input by the user before beginning the tensile testing. In each experiment, the film was stretched until breakage occurs, and the equipment software or other equipment programming creates a stress-versus-strain plot and calculates the desired mechanical properties for the sample. These properties include Young's tensile modulus, tensile stress at break, deformation energy at break, and % strain or elongation at break.

The wet tensile strength of the films was also tested. The films of the present invention can be designed to be flushable. A film that is flushable will have a lower wet tensile strength, thereby allowing the film to pass through drainage systems without clogging the system. The wet tensile properties of the microlayer films were determined using a Sintech tensile tester (SINTECH 1/D) and Testworks 3.03 software. The Sintech tensile tester was modified to include a tank for submerged testing. This tank was large enough to allow the film samples to stretch to failure, while remaining completely under water. Stainless steel, spring-loaded grips were used in place of the non-water compatible, air-actuated grips used for dry testing. The same 50 pound load cell was used. The test method was also identical with a gauge length of 1 inch and a 5 in/min crosshead speed. The thickness of the film was input prior to beginning the tensile testing. The sample was then placed in the grips, and the tank was filled with tap water. Starting when the film was completely submerged, one minute was timed before the test began (this included the time to fill the remainder of the tank). As the test was run, there was an interaction between the moving grips and the water in the tank. This included a substantial buoyancy effect as the grip arm was pulled out of the water. This effect was accounted for prior to reporting any results. The same values were calculated and reported. These include Young's tensile modulus, tensile stress at break, deformation energy at break, and % strain or elongation-at-break.

The elastomeric properties of the films were tested to determine the amount of recovery for each film. The films of the present invention are elastomeric and, therefore, return to nearly their original form after a stretching force has been applied and removed. This recovery is advantageous since these films are being used in flushable personal care articles. To determine the elastomeric properties of the microlayered films the Sintech tensile tester (SINTECH 1/D) and Testworks 3.03 software was used. The tensile tester is a device available from MTS System Co. The software is available from MTS System Co., Sintech Division. Equipment and software having substantially equivalent capabilities may also be employed.

The testing was conducted using a 50 pound load cell, and air actuated, rubber coated, 3 inch grips. The film sample was tested with a gauge length of 2 inches and has a width of 1 inch. The crosshead speed during the test was 500 mm/min. An individual film sample was loaded perpendicular to the grips and was held in place when air pressure holds the grips together. In each experiment, the film was stretched to five pre-set % strain or elongation values. After reaching each target elongation, the grips immediately returned to their initial position and then immediately separated to the next target. While the sample was being stretched, the apparatus was measuring the resistance the film was applying to the grips (load, grams). On the return from each target elongation, the elongation where the film was no longer in tension (load is equal to 0 grams) was calculated by the software. This elongation was divided by the gauge length to give a % set value. The lower the value (which is to say the longer the film stayed in tension), the more elastic the film behaves. The five % elongation values run on these films were 25%, 50%, 75%, 100%, and 150%. The % set values for each of these elongations were calculated and recorded.

The microlayer films of these examples contain PEO which experiences plastic yielding in tensile testing. To reduce effects from this yielding, some of the films tested for elastic properties were stretched prior to testing. This procedure is included in the description of each example.

The films of the present invention were also tested to determine the water vapor transmission rate (WVTR). The films of the present invention are designed to be breathable, such that water vapor will pass through the film. Therefore, any water will not be trapped against the skin of an individual, but rather will pass through the film and into the environment, therefore making the film more comfortable to wear than prior art multi-layer films and also helping to promote skin wellness. The WVTR values for the film materials were calculated in accordance with ASTM Standard E96-80. Circular samples measuring 3 inches in diameter were cut from each of the test materials and a control of CELGARD®2500 microporous film which was available from Hoechst Celanese Corporation. Individual samples of the test materials and a control material were placed across the open tops of the individual vapometer cups containing one hundred milliliters of distilled water. The screw-on flanges were tightened to form a seal along the edges of the cup. The cups were placed in a convection type oven set at 100° F. The relative humidity within the oven was not specifically controlled. The cups were first weighed and then immediately placed into the oven. After 24 hours, the cups were removed from the oven and weighed again. The WVTR of each material was calculated based on the weight loss and WVTR of the control film, assuming the WVTR of the CELGARD®2500 microporous film to be 5000 g/sq.m/24 hr under predetermined set conditions. A specific water vapor transmission rate per 1 mil was calculated by multiplying a measured WVTR by the film thickness.

Example 1

POLYOX® WSR N-3000 (PEO) resin in powder form (Union Carbide Corporation, Danbury, Conn.) was blended with 12 wt % of plasticizer, Tween 20, using a twin screw extruder, and pelletized using an air cooled belt at Planet Polymer Technologies (San Diego, Calif.). A polyester based aromatic thermoplastic polyurethane, MORTHANE® PS370-200 (Morton International, Inc., Chicago, Ill.), in pellet form, was dried in an oven for 3 hours at 80° C. The pellets of PEO resin and dried polyurethane resin were fed into extruders of the microlayer extrusion line available at Case Western Reserve University, Cleveland, Ohio. The extruder temperature was set at 150° C. for the PEO resin and 197° C. for the polyurethane. The feed ratio was controlled by setting corresponding pump speeds at 28 rpm (PEO) and 12 rpm (polyurethane). A microlayer film of 8 layers was produced using 2 cutting and spreading die elements and a 6 inch film die set at 197° C. The cast 8 layer film had a 30/70 PS370-200/PEO ratio by volume and a thickness of about 2 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 2

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 20 rpm (PEO) and 20 rpm (polyurethane). A microlayer film of 8 layers was produced using 2 cutting and spreading die elements and a 6 inch film die set at 197° C. The cast 8 layer film had a 50/50 PS370-200/PEO ratio by volume and a thickness of about 2 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 3

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 12 rpm (PEO) and 28 rpm (polyurethane). A microlayer film of 8 layers was produced using 2 cutting and spreading die elements and a 6 inch film die set at 197° C. The cast 8 layer film had a 70/30 PS370-200/PEO ratio by volume and a thickness of about 2.2 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 4

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 28 rpm (PEO) and 12 rpm (polyurethane). A microlayer film of 16 layers was produced using 3 cutting and spreading die elements and a 6 inch film die set at 197° C. The cast 16 layer film had a 30/70 PS370-200/PEO ratio by volume and a thickness of about 3.3 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 5

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 20 rpm (PEO) and 20 rpm (polyurethane). A microlayer film of 16 layers was produced using 3 cutting and spreading die elements and a 6 inch film die set at 197° C. The cast 16 layer film had a 50/50 PS370-200/PEO ratio by volume and a thickness of about 3 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 6

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 12 rpm (PEO) and 28 rpm (polyurethane). A microlayer film of 16 layers was produced using 3 cutting and spreading die elements and a 6 inch film die set at 197° C. The cast 16 layer film had a 70/30 PS370-200/PEO ratio by volume and a thickness of about 4.25 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 7

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 28 rpm (PEO) and 12 rpm (polyurethane). A microlayer film of 256 layers was produced using 7 cutting and spreading die elements and a 6 inch film die set at 197° C. The cast 256 layer film had a 30/70 PS370-200/PEO ratio by volume and a thickness of about 3.8 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 8

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 20 rpm (PEO) and 20 rpm (polyurethane). A microlayer film of 256 layers was produced using 7 cutting and spreading die elements and a 6 inch film die set at 197° C. The cast 256 layer film had a 50/50 PS370-200/PEO ratio by volume and a thickness of about 3.6 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 9

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A polyester based aromatic thermoplastic polyurethane, MORTHANE® PS370-200 (Morton International, Inc.), in pellet form, was dried in an oven for 3 hours at 80° C. The pellets of PEO resin and dried polyurethane resin were fed into extruders of the microlayer extrusion line. The extruder temperature was set at 150° C. for the PEO resin and 197° C. for the polyurethane. The feed ratio was controlled by setting corresponding pump speeds at 12 rpm (PEO) and 28 rpm (polyurethane). A microlayer film of 256 layers was produced using 7 cutting and spreading die elements and a 6 inch film die set at 197° C. The cast 256 layer film had a 70/30 PS370-200/PEO ratio by volume and a thickness of about 4.5 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at of 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 10

The pellets of MORTHANE® PS370-200 (Morton International, Inc.) were dried in an oven for 3 hours at 80° C. These pellets were then fed into the extruder of the microlayer extrusion line. The extruder temperature was set at 197° C. for the polyurethane. The feed ratio was controlled by setting a corresponding pump speed at 40 rpm. A control polyurethane film was produced using 7 cutting and spreading die elements and a 6 inch film die set at 197° C. The cast film had 100% PS370-200 and a thickness of about 4 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 11

The POLYOX® WSR-3000 (PEO) resin in powder form (Union Carbide Corporation) was blended with 12 wt % of plasticizer, Tween 20, using a twin screw extruder, and was pelletized using an air cooled belt at Planet Polymer Technologies. The pellets of PEO resin were fed into extruders of the microlayer extrusion line. The extruder temperature was set at 150° C. for the PEO resin. The feed ratio was controlled by setting a corresponding pump speed at 40 rpm. A control PEO film was produced using 7 cutting and spreading die elements and a 6 inch film die set at 150° C. The 256 layer cast film was 100% PEO and had a thickness of about 2 mil. The dry and wet tensile properties, the breathability, and the elastic properties of this film can be found in Table 1. No pre-stretching was done on this film prior to the Tension Set test.

Example 12

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. Pellets of an elastomeric low density polyethylene (LDPE) resin, AFFINITY® EG 8200, were purchased from Dow Plastics. The pellets of PEO resin and LDPE resin were fed into extruders of the microlayer extrusion line. The extruder temperature was set at 150° C. for the PEO resin and 170° C. for the LDPE. The feed ratio was controlled by setting corresponding pump speeds at 28 rpm (PEO) and 12 rpm (LDPE). A microlayer film of 256 layers was produced using 7 cutting and die elements and a 6 inch film die set at 170° C. The cast 256 layer film had a 30/70 LDPE/PEO ratio by volume and a thickness of about 3.6 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 13

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. Pellets of a low density polyethylene elastomer resin, AFFINITY® EG 8200, were purchased from Dow Plastics. The pellets of PEO resin and LDPE resin were fed into extruders of the microlayer extrusion line. The extruder temperature was set at 150° C. for the PEO resin and 170° C. for the LDPE. The feed ratio was controlled by setting corresponding pump speeds at 20 rpm (PEO) and 20 rpm (LDPE). A microlayer film of 256 layers was produced using 7 cutting and die elements and a 6 inch film die set at 170° C. The cast 256 layer film had a 50/50 LDPE/PEO ratio by volume and a thickness of about 3.6 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover.

The 1 inch wide samples needed for the Tension Set test were cut from these pre-stretched films.

Example 14

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. Pellets of a low density polyethylene elastomer resin, AFFINITY® EG 8200, were purchased from Dow Plastics. The pellets of PEO resin and LDPE resin were fed into extruders of the microlayer extrusion line. The extruder temperature was set at 150° C. for the PEO resin and 170° C. for the LDPE. The feed ratio was controlled by setting corresponding pump speeds at 12 rpm (PEO) and 28 rpm (LDPE). A microlayer film of 256 layers was produced using 7 cutting and die elements and a 6 inch film die set at 170° C. The cast 256 layer film had a 70/30 LDPE/PEO ratio by volume and a thickness of about 3.6 mil. The dry and wet tensile properties, the breathability, and the elastic properties of this film can be found in Table 1. This film was stretched prior to Tension Set testing. The film was cut/ into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 15

A $CaCO_3$ particulate filler material was intermixed with a low density polyethylene elastomer resin, AFFINITY® EG 8200 (Dow Plastics), by using a high shear mixer, and the filled resin was pelletized. The $CaCO_3$ mean particle size was about 1 micron, and the concentration of $CaCO_3$ was 55 wt % (based on the total weight of the resin and filler). POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. The pellets of PEO resin and filled LDPE resin were fed into extruders of the microlayer coextrusion line. The extruder temperature was set at 170° C. for the filled LDPE resin and was set at 150° C. for the PEO resin. The feed ratio was controlled by setting corresponding pump speeds at 20 rpm (PEO) and 20 rpm (filled LDPE). A microlayer film of 1024 layers was produced using 9 cutting and spreading die elements and a 6 inch film die set at 170° C. The cast 1024 layer film had a 50/50 PEO/filled LDPE ratio by volume and a thickness of about 1 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 16

A $CaCO_3$ particulate filler material was intermixed with a low density polyethylene elastomer resin, AFFINITY® EG 8200 (Dow Plastics), by using a high shear mixer, and the filled resin was pelletized. The $CaCO_3$ mean particle size was about 1 micron, and the concentration of $CaCO_3$ was 55 wt % (based on the total weight of the resin and filler) as measured by the ashes analysis. POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. The pellets of PEO resin and filled LDPE resin were fed into extruders of the microlayer coextrusion line. The extruder temperature was set at 170° C. for the filled LDPE resin and was set at 150° C. for the PEO resin. The feed ratio was controlled by setting corresponding pump speeds at 12 rpm (PEO) and 28 rpm (filled LDPE). A microlayer film of 1024 layers was produced using 9 cutting and spreading die elements and a 6 inch film die set at 170° C. The cast 1024 layer film had a 30/70 PEO/filled LDPE ratio by volume and a thickness of about 1 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 17

A $CaCO_3$ particulate filler material was intermixed with a low density polyethylene elastomer resin, AFFINITY® EG 8200 (Dow Plastics), by using a high shear mixer, and the filled resin was pelletized. The $CaCO_3$ mean particle size was about 1 micron, and the concentration of $CaCO_3$ was 55 wt % (based on the total weight of the resin and filler) as measured by the ashes analysis. POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. The pellets of PEO resin and filled LDPE resin were fed into extruders of the microlayer coextrusion line. The extruder temperature was set at 170° C. for the filled LDPE resin and was set at 150° C. for the PEO resin. The feed ratio was controlled by setting corresponding pump speeds at 4 rpm (PEO) and 36 rpm (filled LDPE). A microlayer film of 1024 layers was produced using 9 cutting and spreading die elements and a 6 inch film die set at 170° C. The cast 1024 layer film had a 10/90 PEO/filled LDPE ratio by volume and a thickness of about 1 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 18

A $CaCO_3$ particulate filler material was intermixed with a low density polyethylene elastomer resin, AFFINITY® EG 8200 (Dow Plastics), by using a high shear mixer, and the filled resin was pelletized. The $CaCO_3$ mean particle size was about 1 micron, and the concentration of $CaCO_3$ was 55 wt % (based on the total weight of the resin and filler) as measured by the ashes analysis. POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. The pellets of PEO resin and filled LDPE resin were fed into extruders of the microlayer coextrusion line. The extruder temperature was set at 170° C. for the filled LDPE resin and was set at 150° C. for the PEO resin. The feed ratio was controlled by setting corresponding pump speeds at 20 rpm (PEO) and 20 rpm (filled LDPE). A microlayer film of 1024 layers was produced using 9 cutting and spreading die elements and a 6 inch film die set at 170° C. The cast 1024 layer film had a 50/50 PEO/filled LDPE ratio by volume and a thickness of about 3 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 19

A $CaCO_3$ particulate filler material was intermixed with a low density polyethylene elastomer resin, AFFINITY® EG 8200 (Dow Plastics), using a high shear mixer, and the filled resin was pelletized. The $CaCO_3$ mean particle size was about 1 micron, and the concentration of $CaCO_3$ was 55 wt % (based on the total weight of the resin and filler) as measured by the ashes analysis. POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. The pellets of PEO resin and filled LDPE resin were fed into extruders of the microlayer coextrusion line. The extruder temperature was set at 170° C. for the filled LDPE resin and was set at 150° C. for the PEO resin. The feed ratio was controlled by setting corresponding pump speeds at 12 rpm (PEO) and 28 rpm (filled LDPE). A microlayer film of 1024 layers was produced using 9 cutting and spreading die elements and a 6 inch film die set at 170° C. The cast 1024 layer film had a 30/70 PEO/filled LDPE ratio by volume and a thickness of about 3 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 20

A $CaCO_3$ particulate filler material was intermixed with a low density polyethylene elastomer resin, AFFINITY (EG 8200 (Dow Plastics), by using a high shear mixer, and the filled resin was pelletized. The $CaCO_3$ mean particle size was about 1 micron, and the concentration of $CaCO_3$ was 55 wt % (based on the total weight of the resin and filler) as measured by the ashes analysis. POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. The pellets of PEO resin and filled LDPE resin were fed into extruders of the microlayer coextrusion line. The extruder temperature was set at 170° C. for the filled LDPE resin and was set at 150° C. for the PEO resin. The feed ratio was controlled by setting corresponding pump speeds at 4 rpm (PEO) and 36 rpm (filled LDPE). A microlayer film of 1024 layers was produced using 9 cutting and spreading die elements and a 6 inch film die set at 170° C. The cast 1024 layer film had a 10/90 PEO/filled LDPE ratio by volume and a thickness of about 3 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 21

A $CaCO_3$ particulate filler material was intermixed with a low density polyethylene elastomer resin, AFFINITY® EG 8200 (Dow Plastics), by using a high shear mixer, and the filled resin was pelletized. The $CaCO_3$ mean particle size was about 1 micron, and the concentration of $CaCO_3$ was 55 wt % (based on the total weight of the resin and filler) as measured by the ashes analysis. The pellets of filled LDPE resin were fed into the extruder of the microlayer extrusion line. The extruder temperature was set at 170° C. for the filled LDPE resin. The feed ratio was controlled by setting a corresponding pump speed of 40 rpm. A control filled LDPE film was produced using 8 cutting and spreading die elements and a 6 inch film die set at 170° C. The 512 layer cast film had a thickness of about 2 mil. The dry and wet tensile properties, the breathability, and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 22

The same as Example 4, only the film was pre-stretched to 100% strain prior to Tension Set testing.

Example 23

The same as Example 5, only the film was pre-stretched to 100% strain prior to Tension Set testing.

Example 24

The same as Example 6, only the film was pre-stretched to 100% strain prior to Tension Set testing.

Example 25

The same as Example 7, only the film was pre-stretched to 200% strain prior to Tension Set testing.

Example 26

The same as Example 8, only the film was not pre-stretched prior to Tension Set testing.

Example 27

The same as Example 8, only the film was pre-stretched to 100% strain prior to Tension Set testing.

Example 28

The same as Example 8, only the film was pre-stretched to 200% strain prior to Tension Set testing.

Example 29

The same as Example 9, only the film was not pre-stretched prior to Tension Set testing.

Example 30

The same as Example 9, only the film was pre-stretched to 100% strain prior to Tension Set testing.

Example 31

The same as Example 9, only the film was pre-stretched to 200% strain prior to Tension Set testing.

Example 32

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A $CaCO_3$ particulate filler material (SUPERMITE from ECC International) was modified with 6 wt % (based on the weight of the filler material) of Dow Corning 193 silicone glycol surfactant (Dow Corning Corporation). The resultant treated and modified filler material was intermixed with a linear low density polyethylene (LLDPE) resin composed of an ethylene-octene-1 copolymer (DOWLEX® NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4 wt % (based on the total weight of the resin, filler, and surfactant) as measured by the ashes analysis. The DOW CORNING 193 silicone glycol surfactant had a HLB number of 12.2. The surfactant modified filled LLDPE resin was dried for 14 hours in a vacuum oven set at 80° C. before microlayer extrusion. The pellets of PEO resin and filled LLDPE resin were fed into the extruders of the microlayer extrusion line. The extrusion temperature was set at 150° C. for the PEO resin and 170° C. for the LLDPE. The feed ratio was controlled by setting corresponding pump speeds at 20 rpm (PEO) and 20 rpm (LLDPE). A microlayer film of 256 layers was produced using 7 cutting and spreading die elements and a 6 inch film die set at 170° C. The cast film had a 50/50 LLDPE/PEO ratio by volume and a thickness of about 2.8 mil. The dry tensile properties and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 300% strain for 30 seconds. The grips then returned to their initial position at approximately 1 in/sec and the film was allowed to recover. The 1 inch wide samples needed for the Tension Set test were cut from these pre-stretched films.

Example 33

POLYOX® WSR N-3000 (PEO) resin in powder form (Union Carbide Corporation) was blended with 12 wt % of plasticizer, Tween 20, using a twin screw extruder, and pelletized using an air cooled belt at Planet Polymer Technologies. A $CaCO_3$ particulate filler material (SUPERMITE from ECC International) was modified with 6 wt % (based on the weight of the filler material) of Dow Corning 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4 wt % (based on the total weight of the resin, filler, and surfactant) as measured by the ashes analysis. The DOW CORNING 193 silicone glycol surfactant had a HLB number of 12.2. The surfactant modified filled LLDPE resin was dried for 14 hours in a vacuum oven set at 80° C. before microlayer extrusion. The pellets of PEO resin and filled LLDPE resin were fed into the extruders of the microlayer extrusion line. The extrusion temperature was set at 150° C. for the PEO resin and 170° C. for the LLDPE. The feed ratio was controlled by setting corresponding pump speeds at 12 rpm (PEO) and 28 rpm (LLDPE). A microlayer film of 256 layers was produced using 7 cutting and spreading die elements and a 6 inch film die set at 170° C. The cast film had a 70/30 LLDPE/PEO ratio by volume and a thickness of about 2.8 mil. The dry tensile properties and the elastic properties of this film can be found in Table 1. This film was stretched prior to Tension Set testing. The film was cut into a 2 inch by 7 inch strip (7" in the machine direction). The film was then placed in the grips of the Sintech tensile tester which were initially 4 inches apart. The grips separated at 10 in/min and stopped and held the final position of 100% strain for 30 seconds. The grips then returned to their initial position at approximately 1 in/sec and the film was allowed to recover. The 1 inch wide samples needed for the Tension Set test were cut from these pre-stretched films.

As can be seen from Table 1 and the previous examples, the tensile properties of PEO/LDPE 256 layer films have been compared with the tensile properties of 256 layer films of PEO and filled linear low density polyethylene. Elastic modulus of the films in machine and cross directions (MD&CD) is also shown in Table 1. A comparison shows that PEO/LDPE microlayer hybrids provide significantly lower tensile modulus around 20 MPa. The tensile modulus for a control of a plain PEO microlayer film was 230 MPa in MD and 300 MPa in CD which is higher than the modulus of a PEO/LDPE hybrid film by a factor of 10. The MD tensile modulus of the PEO/thermoplastic polyurethane (TPU) microlayered hybrid film is also shown in Table 1. The tensile modulus for the 30/70 and 50/50 films of PEO/TPU are only about 6000 psi (41 MPa) and increases with increasing PEO content for 70/30 hybrid film. This dramatically reduced modulus results in a soft, flexible, and less noisy film which are important attributes for a film component used in personal care articles.

Additionally, as can be seen from Table 1, the percent strain at break for the films is surprisingly better. Again a dramatic improvement by a factor of two to three is observed compared to PEO/LLDPE film from Examples 32 and 33. Around 1000% of elongation at break has been observed for the PEO/LDPE microlayer in both MD and CD compared to the strain at break for the control PEO film of 700% in MD and 200% in CD. Also, PEO/LDPE microlayer film provided more balanced elongation at break in machine and cross directions compared to control PEO film. Very high elongation at break is useful for stretch thinning of a hybrid film by using uniaxial or biaxial stretching.

The PEO/LDPE microlayer films also provided improvement in toughness which is characterized by the energy at break. Energy at break values are illustrated are also illustrated in Table 1.

Additionally, as can be seen from Table 1, the microlayer films of PEO and thermoplastic elastomers can advantageously exhibit an enhanced water vapor transmission rate (WVTR) value. In particular, the WVTR of the microlayer film is preferably not less than about 200 g/sq.m/24 hr/1 mil (grams per square meter, per 24 hours, per 0.001 inch of film thickness). Alternatively, the WVTR value is preferably not more than about 10,000 g/sq.m/24 hr/1 mil. The WVTR can be enhanced by reducing the thermoplastic elastomer content in the film, by increasing the number of microlayers in the microlayer film, by addition of a filler, and/or by stretching the film in machine and/or cross direction.

Additionally, as can also be seen from Table 1, the multi-microlayer films of degradable polymer and thermoplastic elastomers can provide films with significantly reduced wet strength and dramatically reduced wet state tensile modulus compared to the properties in a dry state. The reduced wet state tensile properties can be useful for flushable applications. The reduction in wet state tensile properties can be enhanced by increasing the content of a water-degradable component in the microlayer film, by increasing the number of layers, and/or by addition of a filler.

Finally, the multi-microlayer films of water-soluble polymer and thermoplastic elastomers can advantageously provide films having an improved recovery after stretching compared to plain PEO film or multi-layer films of PEO and filled LLDPE as demonstrated by tension set data. The recovery property can be enhanced by increasing the content of thermoplastic elastomer in the microlayer film, by increasing the number of layers, and by film stretching.

TABLE 1

| Dry Tensile Properties | Units | Ex. 1 | Ex. 2 | Ex. 3 | Ex. 4 |
|---|---|---|---|---|---|
| Tensile Strength | MPa | | | | |
| MD | | 25.2 | 40.8 | 56.2 | 37 |
| TD | | 18.7 | 21.7 | 45.9 | 22.6 |
| Elongation | % | | | | |
| MD | | 840.9 | 746.6 | 677.4 | 929.8 |
| TD | | 781.5 | 808.8 | 937.5 | 851.9 |
| Energy to Break | J/cu. cm | | | | |
| MD | | 119.4 | 140.5 | 157.25 | 154.16 |
| TD | | 90.62 | 92.77 | 156.58 | 96.1 |
| Modulus | MPa | | | | |
| MD | | 113.5 | 88.9 | 51 | 68 |
| TD | | 132.8 | 67.9 | 57.8 | 51.8 |
| WVTR | g/sq. m/ 24 h | 1371 | 1169 | 853 | |
| WVTR/1 mil | g/sq. m/ 24 h/mil | 2744 | 2104 | 1706 | |
| Tension set @ | % | | | | |
| 25% | | 5.6 | 6.3 | 6.1 | 6.2 |
| 50% | | 21 | 15.1 | 12.5 | 19.5 |
| 75% | | 43.4 | 27.6 | 20.1 | 40.9 |
| 100% | | 66.1 | 43.5 | 28.4 | 63.5 |
| 150% | | 113 | 85.5 | 50.2 | 111.2 |
| Wet Tensile Properties | | | | | |
| Tensile Strength | MPa | | | | |
| MD | | | | | 18 |
| Energy at Break | J/cu. cm | | | | |
| MD | | | | | 79.8 |
| Modulus | MPa | | | | |
| MD | | | | | 5.9 |
| Dry Tensile Properties | Units | Ex. 5 | Ex. 6 | Ex. 7 | Ex. 8 |
| Tensile Strength | MPa | | | | |
| MD | | 40.7 | 57.1 | 12.6 | 10.6 |
| TD | | 18.9 | 47.9 | 9 | 6.9 |
| Elongation | % | | | | |
| MD | | 910.8 | 769.1 | 949.2 | 812.6 |
| TD | | 739.1 | 1053.2 | 634.3 | 432.5 |
| Energy to Break | J/cu. cm | | | | |
| MD | | 162.9 | 187.6 | 76.6 | 58.1 |
| TD | | 74.9 | 184.5 | 40.3 | 23.4 |
| Modulus | MPa | | | | |
| MD | | 78.8 | 54.4 | 68.2 | 47.2 |
| TD | | 67.9 | 50.8 | 58.4 | 51.3 |
| WVTR | g/sq. m/ 24 h | | | | |
| WVTR/1 mil | g/sq. m/ 24 h/mil | | | | |
| Tension set @ | % | | | | |
| 25% | | 5 | 4.8 | 5.4 | 3.1 |
| 50% | | 15.2 | 11 | 13.8 | 9.2 |
| 75% | | 28 | 18.7 | 24.2 | 15.9 |
| 100% | | 45.1 | 29.8 | 39.5 | 24 |
| 150% | | failure | 51.5 | 83.8 | 50.6 |
| Wet Tensile Properties | | | | | |
| Tensile Strength | MPa | | | | |
| MD | | 16.6 | 26.5 | 2.7 | 1.7 |
| Energy at Break | J/cu. cm | | | | |
| MD | | 79.1 | 94.2 | 14.95 | 8.2 |
| Modulus | MPa | | | | |
| MD | | 5.5 | 13.9 | 0.5 | 0.4 |
| Dry Tensile Properties | Units | Ex. 9 | Ex. 10 | Ex. 11 | Ex. 12 |
| Tensile Strength | MPa | | | | |
| MD | | 27.5 | 68.2 | 9.7 | 16.2 |
| TD | | 29.8 | 72.8 | 7.5 | |
| Elongation | % | | | | |
| MD | | 939.8 | 983.2 | 737.4 | 1243.1 |
| TD | | 929.9 | 1068.6 | 169.4 | |
| Energy to Break | J/cu. cm | | | | |
| MD | | 122.4 | 215.2 | 68.4 | 110.3 |
| TD | | 129 | 251.9 | 13.2 | |
| Modulus | MPa | | | | |
| MD | | 30.4 | 7 | 153.7 | 27.7 |
| TD | | 36.7 | 7.4 | 203.3 | |

TABLE 1-continued

| | | | | |
|---|---|---|---|---|
| WVTR | g/sq. m/24 h | | 332 | 2019 |
| WVTR/1 mil | g/sq. m/24 h/mil | | 1228 | 3028 |
| Tension set @ | % | | | |
| 25% | | 0.9 | 1.7 | 3.4 | 3.8 |
| 50% | | 4.99 | 1.7 | 29.6 | 14.2 |
| 75% | | 9.6 | 4.1 | 54.5 | 29.7 |
| 100% | | 14.1 | 6.3 | 77 | 50.8 |
| 150% | | 25.6 | 10.4 | 121.4 | 94.8 |
| Wet Tensile Properties | | | | | |
| Tensile Strength | MPa | | | | |
| MD | | 5.9 | 51.7 | | 9.7 |
| Energy at Break | J/cu. cm | | | | |
| MD | | 37.6 | 187.6 | | 96.2 |
| Modulus | MPa | | | | |
| MD | | 1.1 | 9.6 | | 3.5 |

| Dry Tensile Properties | Units | Ex. 13 | Ex. 14 | Ex. 15 | Ex. 16 |
|---|---|---|---|---|---|
| Tensile Strength | MPa | | | | |
| MD | | 17.3 | 18.4 | 15.4 | 18.2 |
| TD | | | | | |
| Elongation | % | | | | |
| MD | | 1318 | 1395.6 | 385.5 | 535 |
| TD | | | | | |
| Energy to Break | J/cu. cm | | | | |
| MD | | 125.5 | 128.1 | 37.9 | 55.2 |
| TD | | | | | |
| Modulus | MPa | | | | |
| MD | | 30.4 | 20.9 | 30.4 | 19 |
| TD | | | | | |
| WVTR | g/sq. m/24 h | | | 915 | 329 |
| WVTR/1 mil | g/sq. m/24 h/mil | | | 1006 | 329 |
| Tension set @ | % | | | | |
| 25% | | | | 4.8 | 3 |
| 50% | | | | 15.3 | 10.7 |
| 75% | | | | 32.6 | 22.2 |
| 100% | | | | 53.7 | 38.6 |
| 150% | | | | 98.7 | 78.8 |
| Wet Tensile Properties | | | | | |
| Tensile Strength | MPa | | | | |
| MD | | 10.5 | 17 | 2.7 | 4.6 |
| Energy at Break | J/cu. cm | | | | |
| MD | | 97.5 | 107.5 | 2.4 | 8.9 |
| Modulus | MPa | | | | |
| MD | | 4.5 | 9.9 | 5.6 | 3.8 |

| Dry Tensile Properties | Units | Ex. 17 | Ex. 18 | Ex. 19 | Ex. 20 |
|---|---|---|---|---|---|
| Tensile Strength | MPa | | | | |
| MD | | 12.9 | 13 | 14 | 12.7 |
| TD | | | | | |
| Elongation | % | | | | |
| MD | | 38 | 841 | 885 | 1048 |
| TD | | | | | |
| Energy to Break | J/cu. cm | | | | |
| MD | | 33.7 | 64.8 | 67.6 | 72 |
| TD | | | | | |
| Modulus | MPa | | | | |
| MD | | 7.4 | 39.6 | 32.5 | 21.2 |
| TD | | | | | |
| WVTR | g/sq. m/24 h | 151 | | | |
| WVTR/1 mil | g/sq. m/24 h/mil | 216 | | | |
| Tension set @ | % | | | | |
| 25% | | | 6.1 | 4.1 | 1.4 |
| 50% | | | 19.2 | 13.2 | 7.2 |
| 75% | | | 40.4 | 27.2 | 14.1 |
| 100% | | | 62.6 | 46.4 | 26.9 |
| 150% | | | 106.7 | 86 | 51.5 |
| Wet Tensile Properties | | | | | |
| Tensile Strength | MPa | | | | |
| MD | | 12.7 | 3.6 | 4.5 | 9.3 |
| Energy at Break | J/cu. cm | | | | |
| MD | | 53 | 22.3 | 29.2 | 66.1 |
| Modulus | MPa | | | | |
| MD | | 10.3 | 4.7 | 5.2 | 7.2 |

| Dry Tensile Properties | Units | Ex. 21 | Ex. 22 | Ex. 23 | Ex. 24 |
|---|---|---|---|---|---|
| Tensile Strength | MPa | | | | |
| MD | | 12.5 | | | |
| TD | | | | | |
| Elongation | % | | | | |
| MD | | 1042 | | | |
| TD | | | | | |
| Energy to Break | J/cu. cm | | | | |
| MD | | 66.3 | | | |
| TD | | | | | |
| Modulus | MPa | | | | |
| MD | | 15.2 | | | |
| TD | | | | | |
| WVTR | g/sq. m/24 h | 39 | | | |
| WVTR/1 mil | g/sq. m/24 h/mil | 78 | | | |
| Tension set @ | % | | | | |
| 25% | | 2.2 | 3.5 | 1.7 | 2.9 |
| 50% | | 4.2 | 11.3 | 9.8 | 7.8 |
| 75% | | 10.2 | 23 | 19.4 | 14.6 |
| 100% | | 17.1 | 39.8 | 35 | 24 |
| 150% | | 36.4 | 76.5 | 75.9 | 46.4 |
| Wet Tensile Properties | | | | | |
| Tensile Strength | MPa | | | | |
| MD | | 11.6 | | | |
| Energy at Break | J/cu. cm | | | | |
| MD | | 84.3 | | | |
| Modulus | MPa | | | | |
| MD | | 6.9 | | | |

| Dry Tensile Properties | Units | Ex. 25 | Ex. 26 | Ex. 27 | Ex. 28 |
|---|---|---|---|---|---|
| Tensile Strength | MPa | | | | |
| MD | | | | | |
| TD | | | | | |
| Elongation | % | | | | |
| MD | | | | | |
| TD | | | | | |

TABLE 1-continued

| Energy to Break | J/cu. cm | | | | |
|---|---|---|---|---|---|
| MD | | | | | |
| TD | | | | | |
| Modulus | MPa | | | | |
| MD | | | | | |
| TD | | | | | |
| WVTR | g/sq. m/ 24 h | | | | |
| WVTR/1 mil | g/sq. m/ 24 h/mil | | | | |
| Tension set @ | % | | | | |
| 25% | | 3.1 | 0.9 | 0.2 | 1.7 |
| 50% | | 10.4 | 6.6 | 3.8 | 5.7 |
| 75% | | 19.6 | 15.8 | 8.1 | 10.8 |
| 100% | | 31 | 26.9 | 15.9 | 16.5 |
| 150% | | 64.2 | 51.2 | 35.9 | 31.5 |
| Wet Tensile Properties | | | | | |
| Tensile Strength MD | MPa | | | | |
| Energy at Break MD | J/cu. cm | | | | |
| Modulus MD | MPa | | | | |

| Dry Tensile Properties | Units | Ex. 29 | Ex. 30 | Ex. 31 | Ex. 32 |
|---|---|---|---|---|---|
| Tensile Strength | MPa | | | | |
| MD | | | | | 13.4 |
| TD | | | | | |
| Elongation | % | | | | |
| MD | | | | | 521.3 |
| TD | | | | | |
| Energy to Break | J/cu. cm | | | | |
| MD | | | | | 50 |
| TD | | | | | |
| Modulus | MPa | | | | |
| MD | | | | | 103.6 |
| TD | | | | | |
| WVTR | g/sq. m/ 24 h | | | | |
| WVTR/1 mil | g/sq. m/ 24 h/mil | | | | |
| Tension set @ | % | | | | |
| 25% | | 0.4 | 0.1 | 0.7 | 7.4 |
| 50% | | 4.9 | 2.8 | 3.7 | 31.4 |
| 75% | | 10.2 | 5.8 | 7 | 55.9 |
| 100% | | 16.8 | 8.9 | 10.1 | 78.5 |
| 150% | | 31.6 | 19.4 | 17.9 | failed |
| Wet Tensile Properties | | | | | |
| Tensile Strength MD | MPa | | | | |
| Energy at Break MD | J/cu. cm | | | | |
| Modulus MD | MPa | | | | |

| Dry Tensile Properties | Units | Ex. 33 |
|---|---|---|
| Tensile Strength | MPa | |
| MD | | 18.7 |
| TD | | |
| Elongation | % | |
| MD | | 437.6 |
| TD | | |
| Energy to Break | J/cu. cm | |
| MD | | 49.2 |
| TD | | |
| Modulus | MPa | |
| MD | | 73.58 |
| TD | | |
| WVTR | g/sq. m/ 24 h | |
| WVTR/1 mil | g/sq. m/ 24 h/mil | |
| Tension set @ | % | |
| 25% | | 4.6 |
| 50% | | 19.7 |
| 75% | | 40.2 |
| 100% | | 61.2 |
| 150% | | 105.6 |
| Wet Tensile Properties | | |
| Tensile Strength MD | MPa | |
| Energy at Break MD | J/cu. cm | |
| Modulus MD | MPa | |

The obtained experimental results demonstrate that novel hybrid films of degradable polymer and elastomeric polymer have been developed. The films demonstrate improved tensile properties, enhanced elastomeric behavior, breathability, softness and water sensitivity.

We claim:

1. A multi-microlayer polymer film comprising a plurality of coextruded microlayers including an elastomeric layer comprising a melt-extrudable, thermoplastic elastomer and a degradable layer comprising a melt-extrudable, degradable polymer.

2. The multi-microlayer film of claim 1, wherein the degradable polymer is selected from polyethylene oxide, copolymers of polyethylene oxide and polypropylene oxide, water dispersible ethylene oxide copolymers, water dispersible blends of polyethylene oxide, water degradable grades of polyvinyl alcohol, poly(vinyl pyrrolidone) polyethyloxazoline, water degradable branched polyesters and copolyesters, water dispersible polyurethanes, water degradable acrylic acid based copolymers, water dispersible polyvinyl methyl ether, methyl cellulose, hydroxypropyl cellulose, polylactic acid-poly(ethylene oxide) block copolymers, methylated hydroxypropyl cellulose, hydroxypropyl methyl cellulose, ethyl cellulose, polycaprolactone, polybutylene succinate, poly(butylene succinate-adipate), poly(lactic acid), polyhydroxybutyrate-co-valerate, polyethylene adipate, polypropylene succinate, or mixtures thereof.

3. The multi-microlayer film of claim 1, wherein the thermoplastic elastomer is selected from metallocene low density polyethylene, elastomeric polyurethanes, ethylene-octene copolymers, polyester polyurethane, natural rubber, nitrile rubber, butyl rubber, ethylene-propylene terpolymers, silicone rubber, polyurethane rubber, thermoplastic rubbers, polyamide-polyether block copolymers, styrenic block copolymers, elastomeric block copolymers, copolymers of polyethylene oxide and polybutylene terephthalate, elastomeric polypropylene, or mixtures thereof.

4. The multi-microlayer film of claim 1, wherein the degradable polymer microlayers further comprise an additional material selected from a filler material, a surfactant, a blowing agent or mixtures thereof.

5. The multi-microlayer film of claim 4, wherein the filler material is a particulate material selected from metal oxides, metal hydroxides, metal carbonates, metal sulfates, calcium carbonate, clay, alumina, titanium dioxide, rubber powder, rubber emulsions, pulp powder, wood powder, chitozan powder, acrylic acid powder, or mixtures thereof.

6. The multi-microlayer film of claim 1, wherein the thermoplastic elastomer microlayers further comprise an additional material selected from a filler material, a surfactant, a blowing agent or mixtures thereof.

7. The multi-microlayer film of claim 6, wherein the filler material is a particulate material selected from metal oxides, metal hydroxides, metal carbonates, metal sulfates, calcium carbonate, clay, alumina, titanium dioxide, rubber powder, rubber emulsions, pulp powder, wood powder, chitozan powder, acrylic acid powder, or mixtures thereof.

8. The multi-microlayer film of claim 1, wherein each microlayer has a thickness of from about 10 angstroms to about 150 microns.

9. The multi-microlayer film of claim 8, wherein each microlayer has a thickness of from about 100 angstroms to about 50 microns.

10. The multi-microlayer film of claim 8, wherein each microlayer has a thickness of from about 500 angstroms to about 1.0 microns.

11. The multi-microlayer film of claim 1, wherein the multi-microlayer film has a thickness of less than about 10 mil.

12. The multi-microlayer film of claim 11, wherein the multi-microlayer film has a thickness of less than about 5 mil.

13. The multi-microlayer film of claim 1, wherein the multi-microlayer film comprises from about 8 to about 17,000 microlayers.

14. The multi-microlayer film of claim 13, wherein the multi-microlayer film comprises from about 60 to about 4,000 microlayers.

15. The multi-microlayer film of claim 13, wherein the multi-microlayer film comprises from about 120 to about 1,000 microlayers.

16. The multi-microlayer film of claim 1, wherein the microlayers have a thickness from about 10 angstroms to about 150 microns and the film comprises from about 60 to about 4,000 microlayers.

17. The multi-microlayer film of claim 1, further comprising a tie layer between and laminated to the elastomeric layer and the degradable layer, the tie layer comprising a melt-extrudable polymer.

18. The multi-microlayer film of claim 17, wherein the tie layer comprises a polymer selected from the group consisting of ethylene acrylic acid copolymers, thermoplastic polyesters, polyalkane-poly(ethylene oxide) block copolymers, ionomer resins, and poly(vinyl alcohol) block copolymers.

19. The multi-microlayer film of claim 1, wherein the plurality of coextruded microlayers include a plurality of elastomeric layers comprising an elastomeric, melt-extrudable polymer and a plurality of degradable layers comprising a degradable melt-extrudable polymer, the plurality of elastomeric layers and plurality of degradable layers arranged in a series of parallel repeating laminate units each laminate unit comprising at least one of the degradable layers and at least one of the elastomeric layers.

20. The multi-microlayer film of claim 19, wherein the microlayers have a thickness from about 10 angstroms to about 150 microns.

21. The multi-microlayer film of claim 19, wherein the multi-microlayer film comprises from about 8 to about 17,000 microlayers.

22. The multi-microlayer film of claim 19, wherein the multi-microlayer film comprises from about 60 to about 4,000 microlayers.

23. The multi-microlayer film of claim 19, wherein the multi-microlayer film comprises from about 120 to about 1,000 microlayers.

24. The multi-microlayer film of claim 1, wherein the multi-microlayer film has a tensile modulus of less than about 50 MPa.

25. The multi-microlayer film of claim 24, wherein the multi-microlayer film has a tensile modulus of less than about 20 MPa.

26. The multi-microlayer film of claim 1, wherein the multi-microlayer film has been pre-stretched from about 100 to about 500 percent of the film's original length.

27. A personal care item comprising a body of absorbent material and a microlayer polymer film of claim 1 attached to the body of absorbent material.

28. The personal care item of claim 27, wherein the personal care item is selected from a diaper, an adult incontinence product, a feminine care absorbent product, or a training pant.

29. A wound dressing comprising a body of absorbent material and a microlayer polymer film of claim 1 attached to the body of absorbent material.

30. A disposable garment comprising a microlayer polymer film of claim 1.

31. A laminate comprising a microlayer film of claim 1 laminated to one or more non-woven webs.

* * * * *